United States Patent [19]

Murata et al.

[11] 3,904,826

[45] Sept. 9, 1975

[54] REMOTE CONTROL SYSTEM AND APPARATUS FOR AUTOMATIC TELEPHONE ANSWERING AND RECORDING APPARATUS

[75] Inventors: Masamichi Murata; Yuji Urayama, both of Yokohama; Takamasa Furusawa, Shimizu, all of Japan

[73] Assignees: Victor Company of Japan, Limited, Yokohama, Japan; Dictran International Corporation, San Francisco, Calif.

[22] Filed: Sept. 14, 1973

[21] Appl. No.: 397,538

Related U.S. Application Data

[63] Continuation of Ser. No. 341,674, March 15, 1973, abandoned.

[30] Foreign Application Priority Data

Mar. 18, 1972 Japan .............................. 47-27586

June 12, 1972 Japan .............................. 47-68204

[52] U.S. Cl. ................................................ 179/6 E

[51] Int. Cl.[2] ........................................ H04M 1/64

[58] Field of Search ............................ 179/6 E, 6 R

[56] References Cited

UNITED STATES PATENTS

| | | | |
|---|---|---|---|
| 3,337,690 | 8/1967 | Martin | 179/6 R |
| 3,569,630 | 3/1971 | Parks et al. | 179/6 E |
| 3,651,267 | 3/1972 | Wittenberger | 179/6 R |
| 3,673,332 | 6/1972 | Muller et al. | 179/6 E |
| 3,684,834 | 8/1972 | Bryant, Jr. | 179/6 E |

*Primary Examiner*—Stanley M. Urynowicz, Jr.
*Attorney, Agent, or Firm*—Owen, Wickersham & Erickson

[57] ABSTRACT

A remote control system and apparatus for an automatic telephone answering and recording apparatus comprises: answering means operating with respect to incoming calls in the absence of the called party to close automatically a speaking circuit and transmit to the caller in each case a statement recorded beforehand; recording means for recording messages stated by callers; signal generating means operated by the manipulative pushing of the push buttons of a touch-tone telephone set or the operation of a specific signal generator to generate, as control signals, tone signals corresponding to the numerals from zero to nine of the push buttons; selection detection means operated by coincidence between a combined numeral group on the apparatus side previously set by combining numerals selected at will from the numerals from zero to nine and the combination of control signals successively generated by and transmitted from the signal generating means and operated when an individual control signal corresponds to any numeral of the combined numeral group; and control means for controlling the apparatus with respect to recording, playing back, rewinding, and other operations in accordance with the operation of the selection detection means.

5 Claims, 10 Drawing Figures

REMOTE CONTROL SYSTEM AND APPARATUS FOR AUTOMATIC TELEPHONE ANSWERING AND RECORDING APPARATUS

This is a continuation of application Ser. No. 341,674, filed March 15, 1973 now abandoned.

BACKGROUND OF THE INVENTION

This invention relates generally to a remote control system and apparatus for an automatic telephone answering and recording apparatus and, more particularly, the present invention relates to a system and apparatus for controlling, from a remote place by means of a telephone line, automatic telephone answering and recording operations of an apparatus automatically establishing a speaking circuit for an incoming call signal in the case where no one is at home, transmitting by means of a previously recorded recording tape a necessary message to the caller, and then recording the caller's message, these telephone answering and recording operations being thus controlled in a menner to undergo various operational modes.

An automatic telephone answering and recording apparatus of a type generally employed at present operates automatically to answer each incoming call, to notify the caller that no one is at home, and to record any message of the caller. In order to hear the contents of the message thus recorded, the person for whom the message is intended must, after returning home, manually operate the apparatus to play back or reproduce the recorded message. Accordingly, if it were possible for this called person to carry out the operation of hearing the recorded message by remote control from a place away from his home, it would be very convenient, and, therefore, various methods and means for accomplishing this have heretofore been proposed.

For example, in one proposed method a special whistle is sounded toward a telephone handset, or a portable oscillator is used to send a specific signal at the remote place, while at the automatic telephone answering and recording apparatus, the signal thus sent is received through the use of a lead selector or filter operating only with respect to a specific frequency thereby to accomplish automatically necessary control operation and thereby to send the recorded message subject matter to the called person. By this method, however, in the case where a large number of apparatuses of the same kind are used, the kinds of signals which can be used are limited in number, whereby this method disadvantageously is deficient on the point of security and maintenance of secrets.

On one hand, a method wherein use is made of special combinations of signals for the purpose of maintenance of secrets has been proposed, but the control operations of this method are extremely troublesome, and the attendant problems thereof have been too numerous for wide reduction thereof to practice.

Furthermore, in either of the above described methods, an object such as a whistle or a portable oscillator has been necessary as a signal source for remote control. Another problem has been that, since the signals used have been of one kind or two kinds for a single apparatus, it has been difficult to carry out, not only the mere operation of hearing the recorded subject matter, but remote control procedures of various kinds such as changing or amending the subject matter of the called person's own announcement on the answering side and preventing the erasure of recorded contents of an important message from the caller.

In order to overcome the above described difficulties, the present invention makes use of a telephone set in a touch-tone system directly, as it is, as a controller and makes use of pair tones corresponding respectively to the numerals from 0 to 9. Furthermore, in the case where a dial-type telephone set is used, remote control is accomplished by using the output of a portable signal generator generating the same pair tones as a touch-tone telephone set (also known as a push-phone in Japan).

SUMMARY OF THE INVENTION

Accordingly, it is a general object of this invention to provide a novel and useful remote control system and apparatus for an automatic telephone answering and recording apparatus wherein the difficulties encountered in systems and apparatuses in the prior art are overcome.

More specifically, an object of the invention is to provide a remote control system and apparatus capable of causing from a remote place an automatic telephone answering and recording apparatus to carry out various modes of operation in response to signals of pair tones generated at the time of pushing manipulation of push buttons of a telephone set in a touch-tone system (hereinafter referred to as a touch-tone telephone set) or signals of sounds produced by a signal generator equivalent to the pair tones, the signals of sounds being transmitted through a telephone line. By this system and apparatus, remote control of a large variety of operational modes is possible, and complete preservation of secrets is attainable.

Another object of the invention is to provide a remote control system and apparatus whereby, only when control signal of three digits composed by the combination of pair tones selected at will from pair tones generated when push buttons of numerals from 0 to 9 of a touchtone telephone set are pushed coincide with signals to be detected of selection detection means previously set on the apparatus side, remote control operations of various modes corresponding to the control signals of the three digits can be carried out.

Another object of the invention is to provide a system and apparatus capable of accomplishing remote control by causing the first-digit signal of the signals of three digits to have the function of conversion to the recording mode, the second-digit signal to have the function of conversion to the playing-back mode, and the third-digit signal to have the function of conversion to the rewinding mode.

Still another object of the invention is to provide a system and apparatus capable of accomplishing remote control in a manner such that the apparatus in the recording mode sustains its state without change upon receiving the signal of the first digit, is converted into the play-back mode upon receiving the signal of the second digit, and is converted into the rewinding mode upon receiving the signal of the third digit, sustaining this rewinding mode throughout the period during which the third-digit signal is being received.

A further object of the invention is to provide a system and apparatus capable of accomplishing remote control in a manner such that the apparatus in the playback mode is converted into the recording mode upon receiving the signal of the first digit, is placed in the recording state in the part thereof on the answering side upon receiving the signal of the second digit, whereby recording anew of a statement for call answering becomes possible, and is converted into the rewinding mode upon receiving the signal of the third digit, sustaining this rewinding mode throughout the period during which the third-digit signal is being received. By this system and apparatus, comments can be added into the recording tape for incoming messages.

A further object of the invention is to provide a remote control system and apparatus in which the apparatus in the recording mode and the play back mode is converted into the rewinding mode throughout a period during which the third-digit signal is generated, and the apparatus in these mode states after the third-digit signal stops is converted into the play-back mode.

A still further object of the invention is to provide a remote control system and apparatus in which, by generating the signal of the first digit with respect to the apparatus in the play-back mode throughout a specified time or longer, a stop signal can be recorded at any position on the magnetic tape on the side for recording callers' messages. By this system and apparatus, the rewinding of the tape at the time of rewinding mode can be limited to a prescribed position thereby to prevent erroneous erasure of a recording of callers' messages.

An additional object of the invention is to provide a remote control system and apparatus in which, when the apparatus is in the recording mode, the apparatus can be converted from the recording mode to the ready state after a predetermined timed time from the instant when the telephone receiver is placed in its cradle. By this system and apparatus, it is possible to erase already recorded contents and, at the same time, to record new incoming messages.

Another object of the invention is to provide a remote control system and apparatus in which the tape on the side for recording incoming signals generates a beep tone with respect to an incoming call when it is in the state of being wound up to its extreme end but does not activate the mechanism on the answering side and does not carry out sending out of answering statements. By this system and apparatus, erroneous recording of a caller's message is prevented.

A further object of the invention is to provide a remote control system and apparatus in which, irrespective of the kind and nature of a calling signal, the apparatus can be placed in an answering state after a predetermined time from the instant of the first arrival of the calling signal.

Further objects and features of the invention will be apparent from the following detailed description when read in conjunction with the accompanying drawings.

DETAILED DESCRIPTION

A general description of the control procedures and operation of a remote control system according to the present invention will now be described with reference first to FIGS. 1A, 1B, 2 and 3.

Figure 1A:
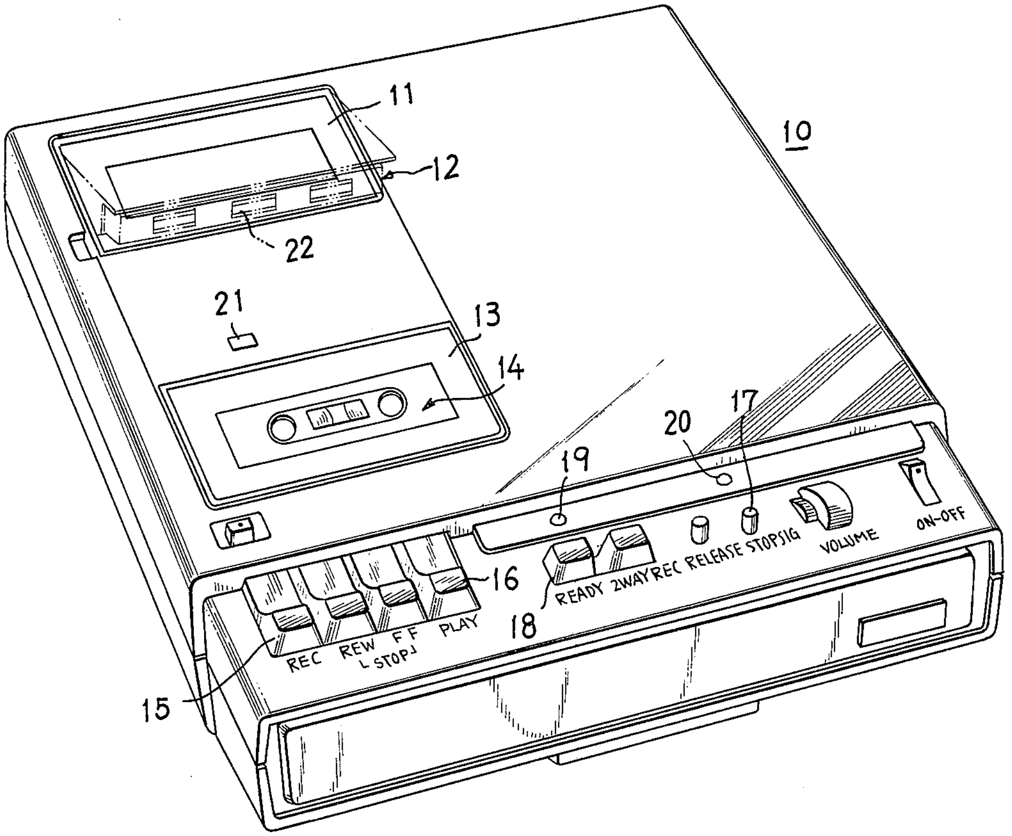
FIGS. 1A, 1B, and 1C are respectively a perspective view, a bottom view, and a diagrammatic plan view of one embodiment of an automatic telephone answering and recording apparatus which is remotely controlled in the system of the present invention.

The automatic telephone answering and recording apparatus (hereinafter referred to simply as "apparatus") 10 as shown in FIG. 1A has an answering-side cassette holder 11, in which is loaded an endless-tape cassette 12 in which a message intended for callers or calling parties has been already recorded. The apparatus 10 also has a cassette holder 13 for the caller's message recording side, in which holder 13 is loaded an ordinary unrecorded cassette 14. The apparatus is provided further with a control panel having a recording button 15, a reproducting or play-back button 16, a button 17 for recording stop signals, a standby or ready button 18, a ready lamp 19, and an operation lamp 20.

When the recording button 15 and the play-back button 16 are pushed, and, further, the button 17 for stop signal recording is pushed, a stop signal is recorded at the head of the tape in the cassette 14 for recording the caller's message. When, upon completion of recording of this stop signal, the ready button 18 is additionally pushed, the apparatus assumes a standby or ready state, and the ready lamp 19 is lit to indicate this state.

When there is an incoming signal from the caller the apparatus in this ready state, the apparatus assumes an automatic answering state, and the direct-current circuit of the telephone line is closed, whereupon the automatic sending out of a notice of absence of the called party over the telephone line is started. Simultaneously, the operation lamp 20 is lit to indicate that automatic answering is being carried out, and, at the same time, an incoming signal lamp 21 is lit to indicate that there has been an incoming signal during the absence of the called party.

Upon completion of the sending out of the notice of absence by the answering side tape, a beep tone signaling the start of recording of any message from the caller is sent out. This beep tone is controlled and sent out by a sensing tape 22 bonded to the endless tape within the cassette 12. Thus, the tape for recording incoming messages operates and starts to record the caller's message. Then, upon completion of one operational cycle of answering and incoming message recording, the apparatus automatically stops and returns to its original state thereby to assume its standby state of readiness for a next incoming call.

If, during the automatic answering operation of the apparatus the power supply is cut off because of power failure or the like reason, all of the functions of the apparatus will stop. Then, when the power supply is restored, as in the case of a temporary power interruption, for example, the tape for answering is set at the head of its recorded message, and the apparatus automatically assumes its ready state without the direct-current circuit of the telephone line being closed.

The foregoing description relates to a function of a known automatic telephone answering and recording apparatus.

Next, the remote control procedure and function constituting a characteristic feature of the system of the present invention will now be described. At the instant when the recording of the tape of the cassette 14 for recording the caller's message has been completed up to the tape end, and the succeeding recording has become impossible, or when the tape end is reached with the apparatus in the play-back or recording state because of erroneous operation during remote control described hereinafter, the cutting off from the telephone line is not effected, and the apparatus generates a signal indicating that the tape end has been reached thereby to stop the driving of the tape and assumes the standby or ready state upon completion of the communication. Then, in the case where there is a next incoming call, the apparatus is coupled to the telephone line, but the called party's message is not sent out. Therefore, by sending a control signal after hearing the beep tone, the owner of the apparatus (the caller in this case) can accomplish remote control.

In the case where the apparatus is to be remotely controlled to hear the content of a call which has come in during the owner's absence, the owner from his outside calling phone calls the telephone to which the apparatus is connected in his home or office and sets the apparatus in its automatic answering state. Then, when the apparatus becomes capable of recording an incoming message, that is, when the beep tone can be heard after completion of the sending out of the notice of absence of the owner, the owner sends to the apparatus a predetermined control signal such as a three-digit numerical control signal, for example.

Figure 2:
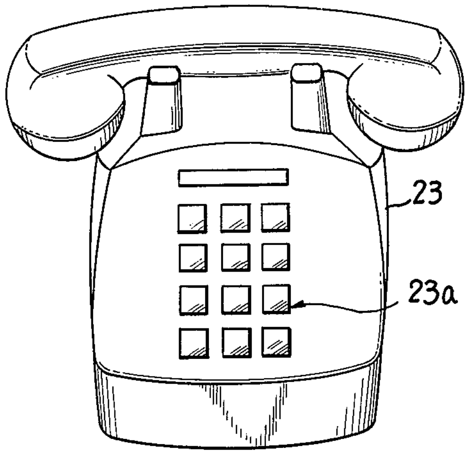
FIG. 2 is a perspective view showing the outer appearance of one example of a touch-tone telephone set which can be utilized in the system of the invention.
Figure 3:
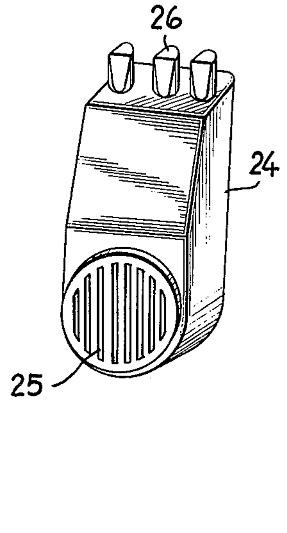
FIG. 3 is a perspective view showing the outer appearance of one example of a pair-tone generator used in the system of the invention.

In order to send this control signal, a touch-tone telephone set as shown in FIG. 2 or FIG. 3 or a portable oscillator is used. In the case where the touch-tone telephone set 23 shown in FIG. 2 is used, the above mentioned three-digit numeral is selected from the digits 0 through 9 of the push buttons 23*a*. By successively pushing the push buttons of the digits thus selected, pair tones corresponding to the digits of the buttons thus pushed are successively generated and used as the above mentioned three-digit control signal.

The portable oscillator 24 shown in FIG. 3 is used in the case where a touch-tone telephone set is not available at the place of remote control, and only a conventional dial type telephone set can be used. The portable oscillator 24 is provided with three buttons 26 for generating pair tones of respective digits. By pushing these buttons in a prescribed sequence, specific pair tones are emitted from the loudspeaker 25. In addition, this oscillator 24 has a selector (not shown) for selectively adjusting as desired the numerals of the digits and, furthermore, has a built-in battery (also not shown) for a power supply.

In this case, with respect to the length and interval with which the signals are sent, standard conditions are previously decided upon. For example, the length of the signal is selected to be 0.5 seconds or more, and at the same time the interval is selected within 5 seconds. In the case where a signal is sent in a form which does not satisfy the conditions thus established, the signal thus sent becomes invalid, and the apparatus cannot be controlled unless a control signal fulfilling these conditions is sent anew. When a three-digit control signal is thus sent from a remote control point, through the telephone line, to the apparatus, it is compared in the apparatus with a preset three-digit numeral.

Figure 1B:
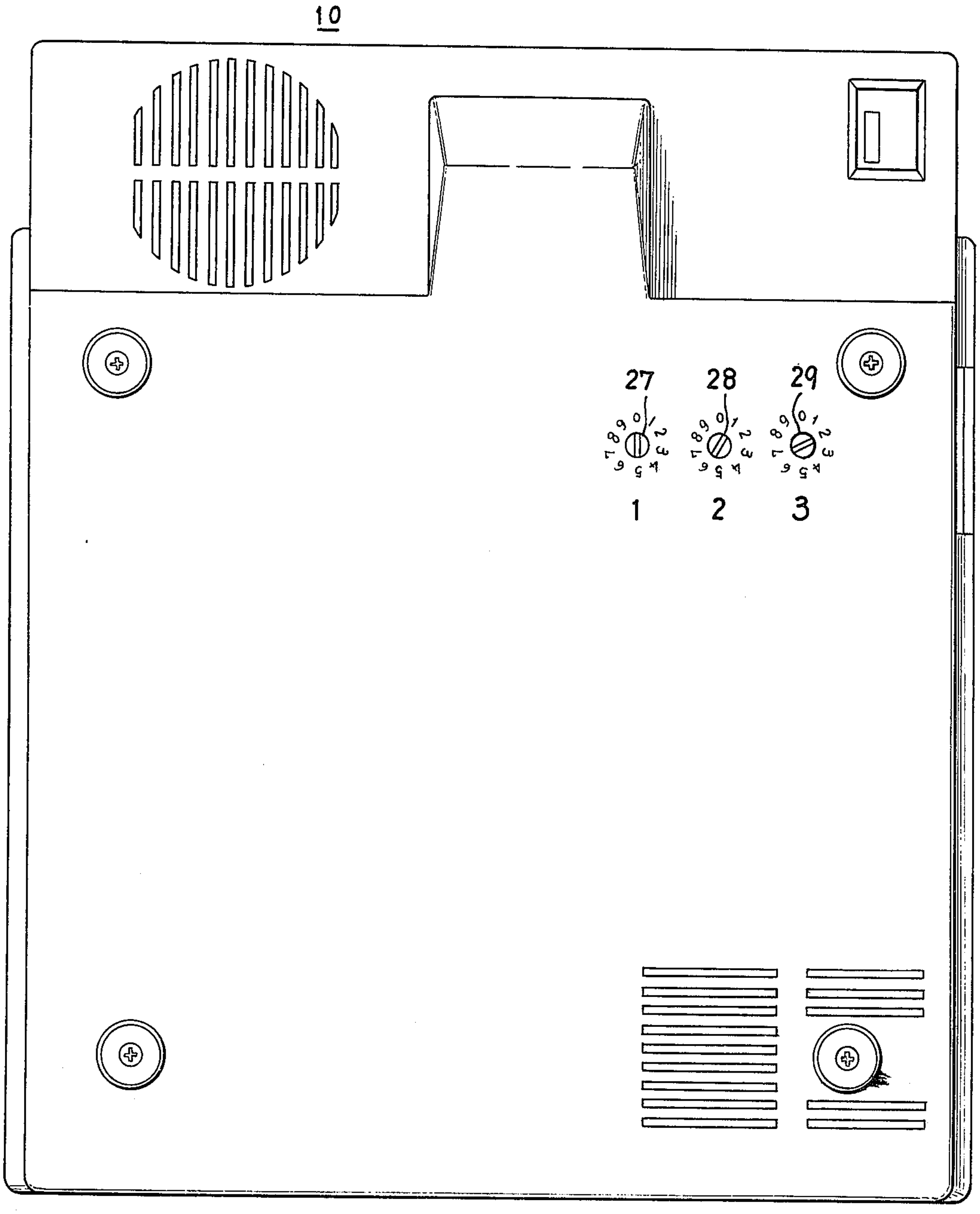

On the bottom surface of the apparatus 10, as shown in FIG. 1B, there are provided three selectors 27, 28, and 29 for selectively setting the above mentioned three-digit numeral. More specifically, the selector 27 is used for setting the numeral of the first digit, the selector 28 for setting the numeral of the second digit, and the selector 29 for setting the numeral of the third digit. This three-digit control signal is kept secret to prevent the device from being connected by a caller who is not authorized to use the apparatus, and the preset combination is thus selectively adjustable at will by the owner by means of the selectors 27, 28, and 29. In the apparatus, as mentioned above, the three-digit control signal is received and compared with the preset three-digit numeral, and, when the two numerals coincide, the following control operation is carried out.

First, when, with the apparatus is in the state for recording a caller's message, a control signal coinciding with the preset three-digit numeral is received, the apparatus assumes a rewinding state and rewinds the tape for recording callers' messages within the cassette 14 until a stop signal is detected. Once, this rewinding has been accomplished, controls of different functions corresponding respectively to the three-digit numerals mentioned above are carried out. More specifically: the numeral of the first digit is assigned the function of placing the apparatus in the recording state; the numeral of the second digit is assigned the function of placing the apparatus in the reproducing or playing back state; and the numeral of the third digit is assigned the function of placing the apparatus in the state of rewinding.

Accordingly, when the apparatus is in the recording state, the apparatus continues to be in its recording state when the signal of the numeral of the first digit is received, assumes the play-back state when the signal of the second-digit numeral is received, and assumes the rewinding state upon receiving and as long as it is receiving the signal of the third-digit numeral and automatically assumes the play-back state when the third-digit signal is no longer received.

When the apparatus is in the reproducing or play-back state, it assumes the recording state upon receiving the signal of the first-digit numeral, and when it receives the signal of the second-digit numeral, the mechanism of its answering side assumes the recording state, whereby another new recording of an answering statement becomes possible. Then, upon receiving the signal of the third-digit numeral, the apparatus assumes the rewinding state as long as this signal is being received and automatically assumes the play-back state when the signal is no longer received similarly as at the time of the recording state.

When the telephone handset is placed on its cradle upon recording of the message of the caller, the apparatus continues to be in its silent state, and thereafter the apparatus is automatically stopped by a voice activity control (VAC) operation and assumes the standby or ready state to await the succeeding call.

In some cases when the recorded message has been heard at the remote calling place, there may arise the necessity of preserving the message in its recorded state because of the importance of its content. In order to prevent an erroneous erasure of this record message, it is possible to record a stop signal at any position on the tape of the cassette 14 from the remote place of call so that the tape will not be rewound beyond a certain part when the next call is received. In such a case, when the apparatus is in either the playback state or the recording state, the signal of the first digit is sent for a specific time, for example, eleven seconds or more, and the control signal is recorded, whereupon the apparatus automatically stops and assumes the ready state. This recorded signal becomes a stop signal, and when a call is made the next time to effect remote control of the apparatus, it carries out rewinding up to the part where this stop signal has been recorded and immediately thereafter changes to the play-back state. Therefore, there is no possibility of erasure of the content of incoming messages on the tape in front of the newly recorded stop signal.

In the case where the content of the recorded incoming message which has just been heard may be erased in entirety, the sending of the signal of the third-digit numeral is continued, and the tape is rewound up to the part thereof where winding begins and a stop signal is recorded. The apparatus thereupon changes from the rewinding state to the play-back state. Accordingly, after the stop signal recorded in the initial beginning part of the tape has been verified, the signal of the first-digit numeral is sent, and after the apparatus has been placed in the recording state from the play-back state, the handset is returned to its cradle. The apparatus thereupon assumes the ready state, and, when the succeeding call is received, the tape for recording incoming messages can be used again from its initial beginning part.

In the case where, when the content of a recorded incoming message is being listened to with the apparatus in play-back state, it is desired at an intermediate instant to hear again the message which has already been played once, the signal of the third-digit numeral is sent for a time period corresponding to the amount of rewinding, whereupon it is possible to rewind through any desired amount. After rewinding, the apparatus immediately assumes the play-back state, and replaying back of the message content can be readily carried out.

When, with the apparatus in the play-back state and the content of the recorded message being listened to, it is desired to add a comment regarding the content of this message, the signal of the first-digit numeral is sent, and after the apparatus is placed in the recording state, the necessary comment is sent and thereby recorded. Thereafter, the signal of the second-digit numeral is sent, and the apparatus is placed in the play-back state, whereupon it becomes possible again to continue listening to the recorded message.

A still further feature of the invention is that, in the event that for some reason such as a change in the owner's schedule, the content of the notice of the owner's absence to be sent out can be revised in the following manner. When with the apparatus in the play-back state, a signal of the second-digit numeral is sent, the circuit of the side of the apparatus for recording incoming messages stops operating, and the circuit on the answering side operates. Then, when a signal for starting the recording of a notice of the owner's absence is sent, and the circuit operation of the apparatus is changed over from the incoming message recording side to the answering side, the answering side assumes the recording state and starts recording of a new notice of the owner's absence.

When the tape of the cassette 12 completes one circuit of travel, an autocheck of the recording is next carried out, and the new content of the notice of the owner's absence which has been just recorded is verified. The changing over of those modes of operation is carried out by a sensing operation. Upon completion of the check, the circuit of the apparatus is automatically changed over to the side of recording incoming messages and assumes the play-back state. Accordingly, in the case where one more revision is necessary after the check, the above described procedure is repeated.

As described above, by sending control signals of specific digits which he has himself predetermined, the owner of the apparatus can, from a remote place, carry out by remote control various control operations such as listening to recorded messages from callers during his absence, changing the notices recorded by him to be transmitted to callers, erasing or recording recorded incoming messages, and preventing the erasure of important recorded incoming messages.

The specific organization of one embodiment of the apparatus of the invention having the function of answering calls in the owner's absence and the remote control function as described above will now be described with reference to FIGS. 4A, 4B and 5A, 5B showing circuit diagrams of the embodiment of the apparatus according to the invention.

When the power-supply switch S1 connected to the primary winding side of a power-supply transformer T1 is switched on, that is, closed, a power lamp PL1 connected to the secondary winding side of the transformer T1 is lit. The resulting AC voltage is converted by a power-supply circuit X15 into a DC voltage, for example of 12V, which is supplied through a line 30 to various circuits of the apparatus.

Figure 1C:
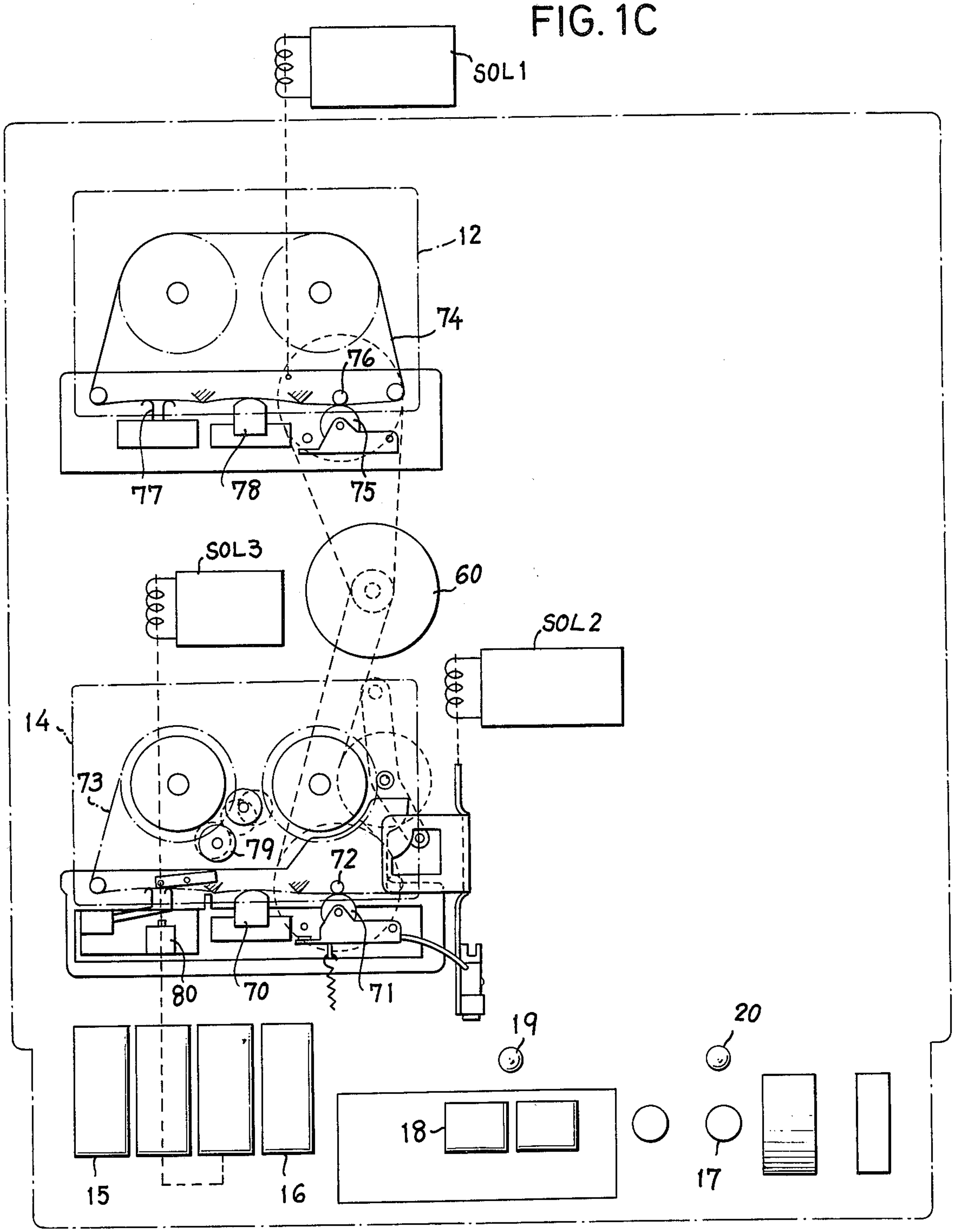

A cassette 12 containing an endless tape on which a notice to be sent to a caller has already been recorded is loaded into the cassette holder 11 on the answering side of the apparatus, and a cassette 14 for recording incoming messages from callers is loaded into the cassette holder 13 on the callers' message recording side. Then, when the recording button 15 and the play-back button 16 are pushed, recording changeover switches S2-1 through S2-9 and play-back switches S4-1 and S4-2, being mechanically coupled to these buttons 15 and 16, are respectively changed over from their states indicated in FIG. 4 and are thus locked. When the button 17 for stop signal recording is successively pushed, switches S7-1 and S7-2 operate in intercoupled relation thereto, whereby a stop signal recording and holding circuit X16 operates for a certain specific time. As a consequence, a stop signal generating circuit X14 operates for a specific time, and an oscillation output is supplied therefrom, through relay contact points Sf2, and Se1, to an incoming message recording head H3. In FIG. 1C, a head assembly 70 comprises a recording head H3 and erasing H4.

On one hand, the output of the above mentioned circuit X16 for stop signal recording and holding is applied through a line 31 to an incoming message recording side control relay 52, which thereupon operates to close relay contact points Sc1 and Sc2. Consequently, the output of the DC current supply circuit X15 is applied through switches S3-1 and S4-1 and the relay contact point SC2 to a sensor operating circuit X15 to activate the same, and the resulting output therefrom is applied by way of a resistor R3 and a diode D8 to the base of a transistor Tr1, which thereupon assumes a conductive state.

Furthermore, the output DC current from the circuit X15 is applied through the closed switch S4-1 and relay contact Sc2 to a solenoid SOL2 on the message recording side, one side of which is grounded through the transistor Tr1. The plunger solenoid SOL2 thereupon operates, whereby a pinch roller 71 of the tape recorder on the incoming message recording side is pressed against a capstan 72. Furthermore, the DC current flowing through the switch S4-1 is supplied through a diode D4 to a DC motor 60 for driving simultaneously capstans installed in a tape recorder on the incoming message recording side and a tape recorder on the answering side thereby to cause this motor to operate.

In addition, the output current from the circuit X15 is applied by way of the switches S3-1 and S4-1, relay contact point Sc2, and switch S2-7 to an amplifier switch circuit X8, the resulting output of which is applied to a bias oscillator X13 and, at the same time, is supplied by way of an amplifier switch circuit X11 to a recording amplifier X12. Consequently, the tape 73 for recording incoming messages of the cassette 14 is clamped between and driven by the corresponding pinch roller 71 and capstan 72, and, at the same time, the output signal from the stop signal generating circuit X14 is recorded as a stop signal by the incoming message recording head H3. This stop signal recording operation is held only during the operation time (approximately 10 seconds) of the aforementioned stop signal recording and holding circuit X16.

Figure 4A:
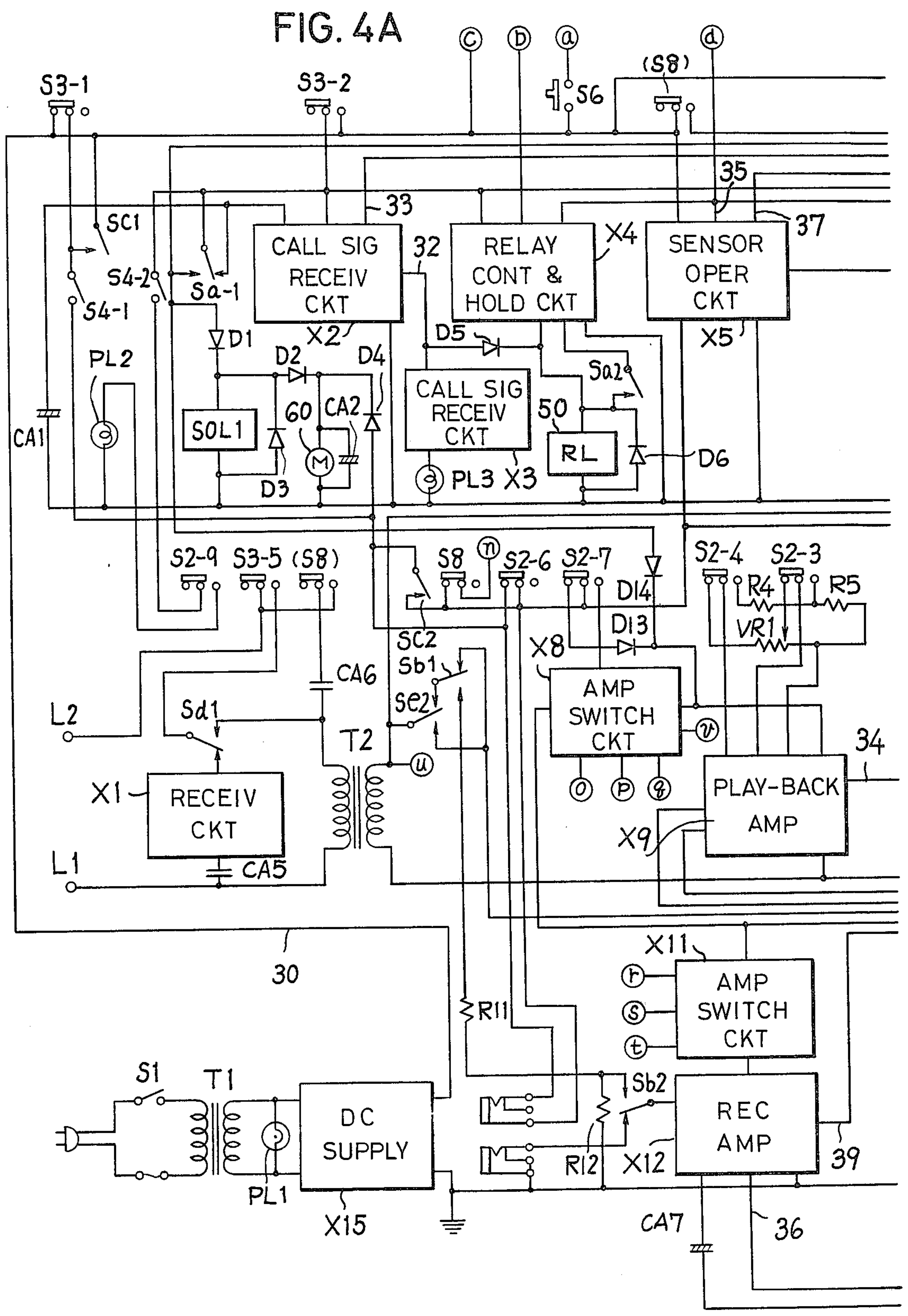
FIGS. 4A, 4B and 5A, 5B are circuit diagrams showing various essential parts of one embodiment of a control circuit in an automatic telephone answering and recording apparatus remotely controlled in the system of the invention.
Figure 4B:
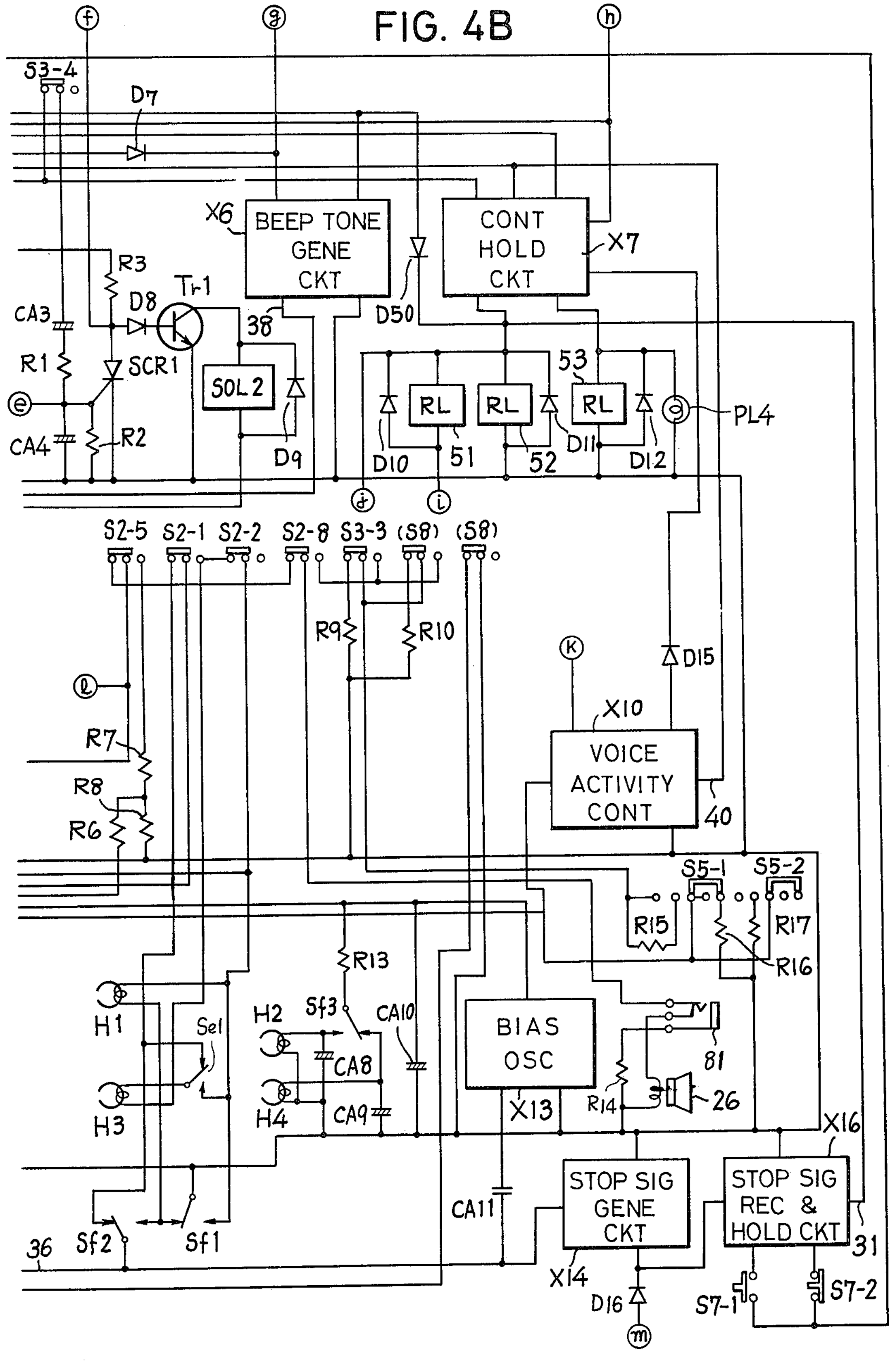

After completion of the recording of the stop signal, the standby or ready button 18 is pressed, whereupon absence recording selection switches S3-1 through S3-5 are changed over from their respective states indicated in FIG. 4A, and DC voltage is supplied through the switch S3-2 and a line 41 to a relay controlling and holding circuit X4, which thereupon operates. Consequently, an answering relay 50 operates, whereby its relay contact points Sa1 and Sa2 are changed over, and as a result of the changing over of the relay contact point Sa2 for self-holding, the relay 50 is self held. Consequently, a DC voltage is supplied by way of the switch S3-2, relay contact point Sa1, and a diode D1 to a plunger solenoid SOL1 on the answering side and is further supplied by way of a diode D2 to the DC motor 60. As a consequence, an endless tape 74 within the answering side cassette 12 is clamped between and driven by a pinch roller 75 and a capstan 76.

When, during the travel of this endless tape 74, the sensing tape 22 reaches a sensor 77, the sensor operating circuit X5 operates, and a pulse signal is supplied by way of a line 35 to the relay control holding circuit X4. As a consequence, the relay contact point Sa2 for self holding is opened, whereby the relay 50 is placed in its inoperative state, and the plunger solenoid SOL1 and the DC motor 60 are rendered inoperative. Accordingly, the above mentioned endless tape for answering automatically stops, whereby resetting of the tape to its starting point is accomplished.

On one hand, the power-supply voltage is supplied by way of the switches S3-2, S4-2, and S2-9 to a ready lamp PL2 (lamp 19 in FIG. 1A), whereby this lamp is lit to indicate that the apparatus has assumed the ready state.

Next, the operation in the case where, with the apparatus in the above described ready state, a call is received will be described. When a call signal arrives at terminals L1 and L2 for connection to the telephone line, it flows along a closed circuit comprising the terminal L2, the switch S3-5, a relay contact point Sd1 of a relay 53, a receiving circuit X1 for receiving call signals, a capacitor CA5, and the terminal L1, whereupon the receiving circuit X1 operates. In intercoupled relation with this operation of the circuit X1, a call signal receiving circuit X2 operates and produces an output, which is supplied through a line 32 to a call signal receiving circuit X3 and the relay 50. Consequently, a call reception lamp PL3 (lamp 21 in FIG. 1A) is lit, and the relay operates.

The relay 50 is self held in operative state by the closure of the relay contact point Sa2 for self holding and the operation of the relay control holding circuit X4. Furthermore, as a consequence of the operation of the relay 50, a DC voltage is applied by way of the swtich S3-2, and relay contact point Sa1 to the plunger solenoid SOL1 for driving the apparatus on the answering side and to the motor 60 and is applied further through a diode D14 to a play-back amplifier X9 thereby to activate these components.

As a consequence, the endless tape 74 for answering, in reset state wherein its head or starting point is positioned for operation, is clamped between and driven by its pinch roller 75 and capstan 76, and playing back of a message for answering recorded on the tape of the cassette 12 by a recording and play back head H1 of the head assembly 78 for answering and the play-back amplifier X9 is carried out. The output of the play-back amplifier X9 passes through a line 34, the switch S2-5, and an attenuator comprising resistors R6, R7, and R8, through relay contact points Sb1 and Se2 of relays 51 and 54 and further through a coupling transformer T2, passes further through the relay contact point Sd1 connected in changed over state of the relay 53, the swtich S3-5, and the terminal L2, and is sent into the telephone line as an answering message for transmitting a notice of the owner's absence.

The ouput of the call signal receiving circuit X2 passes through a line 33 and is supplied to the relays 52 and 53 and a control holding circuit X7 for control holding of an operation lamp PL4. Consequently, the relay 53 operates, whereby the relay contact point Sd1 is changed over, and the operation lamp PL4 (lamp 20 in FIG. 1A) is lit thereby to indicate that the apparatus is operating.

When the message of notification of the owner's absence is sent, and the endless tape 74 for answering of the cassette 12 completes one revolution of travel, whereby the sensing tape 22 arrives at the position of the sensor 77, the sensor operation circuit X5 operates, and different output signals appear in lines 37 and 35. The output signal appearing in the line 37 from the circuit X5 is supplied to a beep-tone generating circuit X6, which thereupon operates. The resulting output of this circuit X6 passes through a line 38 and is sent as a beep tone by way of the transformer T2, relay contact point Sd1, switch S3-5, and terminal L2 to the calling party or the caller.

The output signal appearing in the line 35 from the sensor operation circuit X5 is supplied to the relay controlling and holding circuit X4. Consequently, the relay 50 is released from its held state, and, as described above, the plunger solenoid SOL1 for driving the apparatus on the answering side is changed into an inoperative state, whereby the travel of the endless tape 74 for answering is again stopped in the rest head position.

On one hand, the output signal of the circuit X5 appearing in the line 35 is supplied to the controlling and holding circuit X7, and the resulting output from this circuit functions to hold the relays 51 and 52 in operative state. Consequently, the relay contact points Sb1, Sb2, Sc1, and Sc2 are changed over, and the motor 60 and the plunger solenoid P2 operate, whereby the operation of the apparatus is changed over to the incoming message recording state as described before. Therefore, by hearing the beep tone, the caller can verify the fact that the apparatus has been set for recording of incoming messages.

A voice signal for transmitting a message from the caller is sent through the telephone line and, entering the apparatus through the terminal L2, passes through the switch S3-5, contact point Sd1, transformer T2, relay contact point Sc2, relay contact point Sb1 in changed over state, an attenuator comprising resistors R11 and R12, and relay contact point Sb2 in changed over state to be supplied to the recording amplifier X12. The resulting output from this amplifier X12 is supplied by way of a line 36, the relay contact point Sf2 of relay 55, and the relay contact point Se1 of relay 54 to the recording head H3 of the head assembly 70 on the incoming message recording side. Furthermore, a bias current from the bias generating circuit X13 in operative state is simultaneously being supplied to the recording head H3, by which the caller's message is recorded on the unrecorded cassette tape 73 of the incoming message recording cassette 14.

At this time, monitor switches S5-1 and S5-2 are changed over, whereupon an output signal appearing in a line 39 from the recording amplifier X12 is supplied by way of monitor switches S5-1 and/or S5-2 and the switches S3-3 and S2-8 to an earphone jack 81 and further to a loudspeaker 26. Accordingly, it is also possible to monitor by means of the loudspeaker 26 the presently recorded message from the caller. Furthermore, the output of the recording amplifier X12 is conducted by way of the aforementioned line 39 to enter a voice activity control circuit (VAC) X10, which produces a DC output in accordance with the presence or absence of an input signal. The resulting output of this VAC X10 is supplied through a diode D15 to the controlling and holding circuit X7, which is thereby held in operative state, and the apparatus is held in the state for recording incoming messages. Upon completion of the speaking of a message by the caller, and he places the handset on its cradle, the input signal from the recording amplifier X12 to the VAC X10 stopes, and the output of this circuit X10 passing through the diode 15 expires after approximately 10 seconds. As a consequence, the controlling and holding circuit X7 is rendered inoperative, and the relays 51, 52, and 53 also become inoperative. Accordingly, the apparatus is uncoupled from the telephone line, and the motor 60 and the plunger solenoid SOL2 for driving the apparatus on the side for incoming messages are rendered inoperative and returned to their original ready states.

At this time, the ready lamp 19 (lamp PL2 in FIG. 4A) continues to be lit, but the operation lamp 20 (lamp PL4 in FIG. 4B) is extinguished. Furthermore, the call signal lamp 21 (lamp PL3) continues to be lit to indicate that an incoming call signal was received during the owner's absence. This call signal lamp 21 (PL3) is extinguished by once releasing the apparatus from its ready state or by operating a cut-off switch.

In the case where, during the above described automatic answering operation, the supply of power stops because of some reason such as a temporary power failure and is then restored, the apparatus operates as follows. When the supply of power stops while, the apparatus connected to the telephone line side, the operation of notifying a caller of the owner's absence or recording of a caller's message is being carried out, all of the driving mechanisms and circuits are rendered inoperative.

Then, when the power supply for the apparatus is restored, an output voltage from the DC power supply circuit X15 is supplied by way of the switch S3-2 and the line 41 to the relay controlling and holding circuit X4, which thereupon operates. Accordingly, the relay 50 is held in operative state, and the motor 60 and the plunger solenoid SOL1 on the answering side operate similarly as described hereinbefore, whereby the endless tape 74 for the answering side is clamped and driven. Similarly as described above, when the sensing tape 22 bonded onto the endless tape 74 arrives at the position of the sensor 77, and the sensor operation circuit X5 operates, the apparatus on the answering side is rendered inoperative, and the endless tape for answering is stopped in the state wherein its head is reset for start of operation. In this case, however, since the relay 53 is in inoperative state, and the apparatus is cut off from the telephone line, the transmission of the notification of the owner's absence to a caller is not carried out.

The apparatus constituting the essential part of the system and apparatus of the invention is controllably manipulated and operated by its owner in the following manner in operating it by remote control.

The aforementioned three-digit numerals of the apparatus 10 are selected and set beforehand by adjustably setting the selectors 27, 28, and 29 on the bottom face of the apparatus, as shown in FIG. 1B. When the owner sends a call from a remote place to the telephone place to the telephone set as his home or office to which the apparatus 10 is connected, the answering notice and beep tone recorded on the endless tape 74 for answering is transmitted to the caller in the same manner as in the operation resulting from a call made by an ordinary caller. Thus, the endless tape 74 travels through one cycle and is stopped at the position where the sensing foil 22 reaches the sensor position. At this time, the apparatus assumes the state for recording incoming messages, the relays 51 and 52 being in operative state, and the output voltage of the DC power supply circuit X15 is applied by way of the relay contact point Sc1, switch S4-1, relay contact point Sc2, and a switch S8 to a line *n*.

Then the person desiring to carry out remote control operates the control signal transmitting means described hereinbefore with reference to FIGS. 2 and 3 thereby to cause remote control signals corresponding to predetermined numerals of the three digits to be emitted in the prescribed sequence, sending these signals through the telephone set microphone and telephone line to the apparatus. Upon receiving these signals, the apparatus starts the rewinding of the tape for recording incoming messages by the following operation.

Figure 5A:
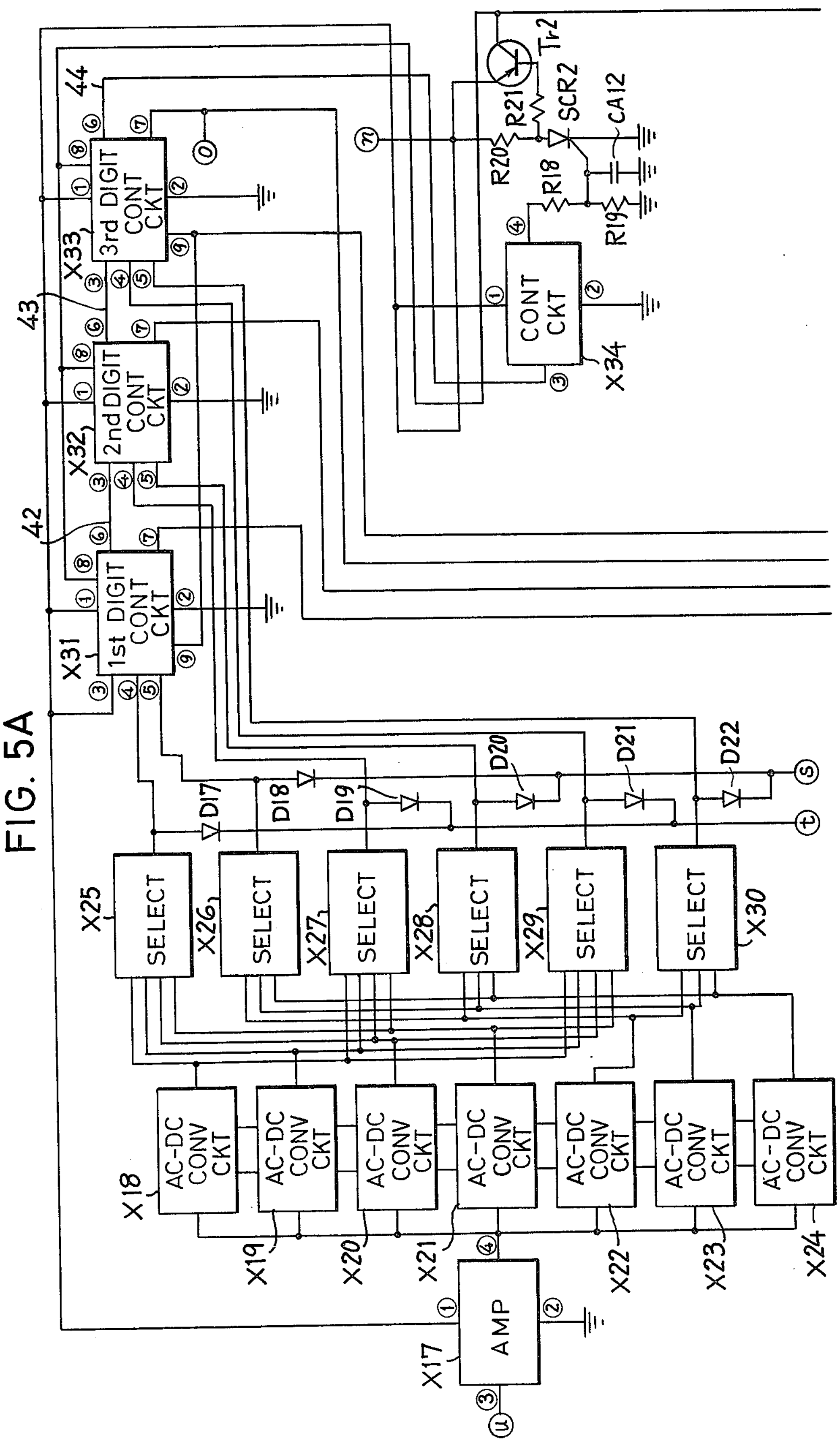
Figure 5B:
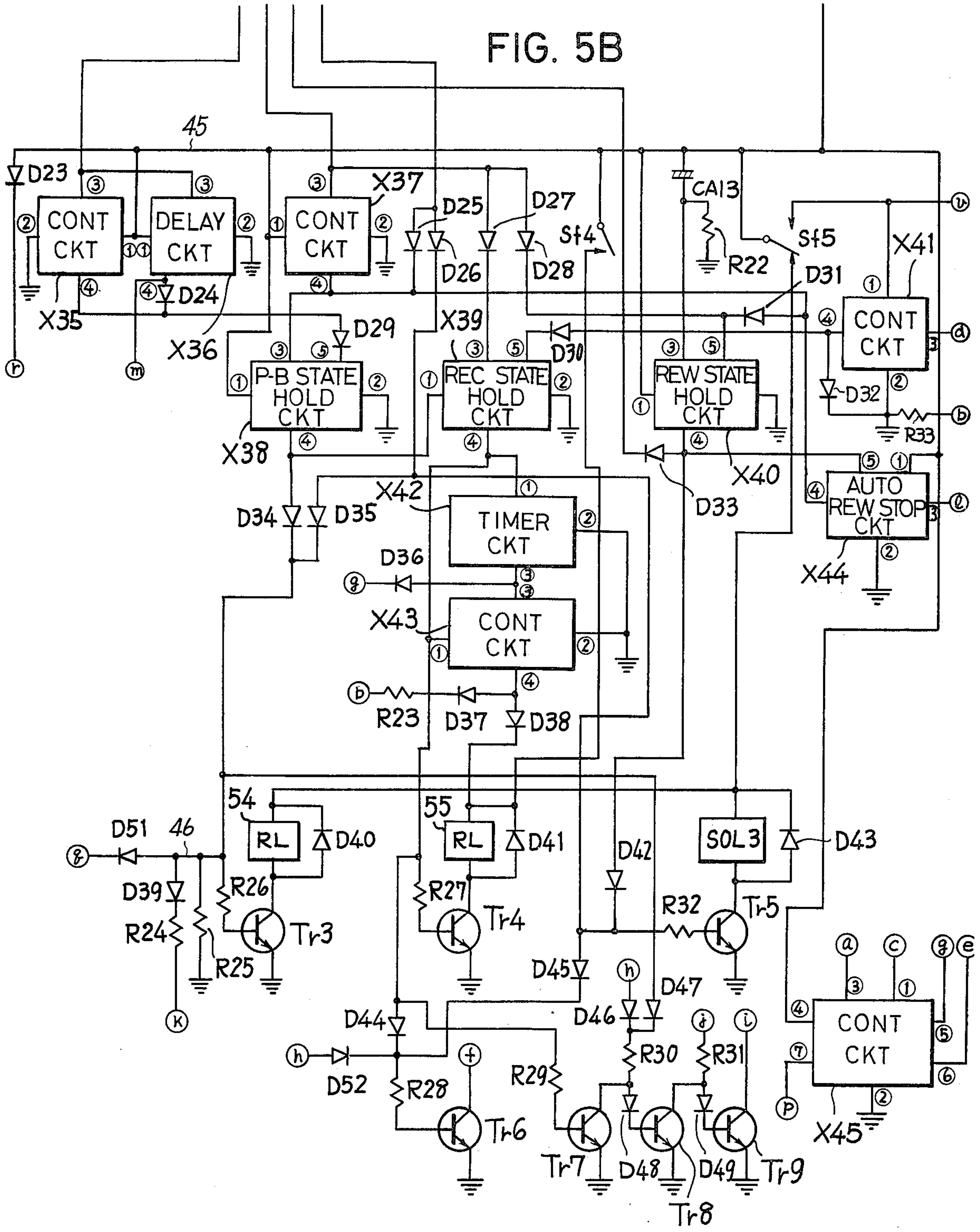

Each pair tone composed of a pair of signals of a high tone and a low tone and constituting a control signal is supplied from the telephone line by way of the coupling transformer T2 and a line *u* to an amplifier X17 with limiter shown in FIG. 5A and is here amplified. The signal thus amplified further passes through a circuit group consisting of circuits X18 through X24 for respectively selecting high tones and low tones, and the numerals from 0 to 9 are distinguished according to the combinations of the high tones and low tones which have passed through this circuit group.

Each of these AC-DC conversion circuits X18 through X24 comprises, principally, a band-pass filter passing only a specific frequency, an amplifier for amplifying the output of this filter, a rectifier for rectifying the resulting amplified output, and, further, a DC amplifier for amplifying the signal thus rectified. The pass frequencies of the band-pass filters in these AC-DC conversion circuits are predetermined as follows: 697 Hz in X18; 770 Hz in X19; 852 Hz in X20; 941 Hz in X21; 1,209 Hz in X22; 1,331 Hz in X23; and 1,477 Hz in X24. The outputs of these AC-DC conversion circuits X18 through X24 are suitably combined in three or four groups and applied to selectors X25 through X30.

The selector X25 is the selector of the low tone of the first digit, while the selector X26 is the selector of the high tone of the first digit. Similarly, the selectors X27 and X28 are respectively the selectors of the low tone and the high tone of the second digit, while selectors X29 and X30 are respectively the selectors of the low tone and the high tone of the third digit. The output of the selectors X25 and X26 of the first digit are applied to a control circuit X31 of the first digit. Similarly, the outputs of the selectors X27 and X28 of the second digit are applied to a control circuit X32 of the second digit, and the outputs of the selectors X29 and X30 of the third digit are applied to a control circuit X33 of the third digit.

The distinguishing or reading of the above mentioned numerals is accomplished in the following manner. When, in a circuit wherein the selectors X25 through X30, such as rotary switches, and the circuits X18 through X24 are connected, a signal of the first digit which has passed through a filter of a combination corresponding to a certain specified numeral coincides with the selector contact connection, it activates the control circuit 31, which thereupon sends a signal through the output line 42 thereof to control the control circuit X32. This signal is held for approximately 5 seconds. Accordingly, if there is no arrrival of a succeeding signal within this 5 second period, the preceding signal up to this instant will be nullified. On the other hand, if the signal of the first digit does not coincide with the selector contact connection, the control circuit X31 will not operate, whereby it will not be possible to control the apparatus from the remote point.

Next, in the case where the signal of the second digit passing through the filter group X18 through X24 coincides with the selector connection, the control circuit X32 receives an input at its input terminals ④ and ⑤ and operates to produce an output, which enters the control circuit X33 through a line 43. This signal is also held for 5 seconds. In the case where the signal of the second-digit numeral coincides with the numeral preset in the apparatus, also, if the signal of the third digit which next arrives through the filter group X18 through X24, upon being received, coincides with the selector connection, it will be applied to the input terminals ④ and ⑤ of the control circuit X33.

Thus, the control circuit X33 operates and produces an output, which passes through a line 44 to enter a control circuit X34. This control circuit X34 is capable, after an input applied thereto has been cut off, of supplying an output for a specific time to another circuit. After an output signal from the circuit X33 for the control circuit X34 stops, the output produced from the circuit X34 is applied to the gate of a silicon control rectifying element SCR2, which thereupon becomes conductive. Consequently, a regular-direction bias is applied to the base of a transistor Tr2, which thereby is turned "ON".

When this transistor Tr2 is turned on, a voltage is supplied to the entire remote-control circuit. Furthermore, a voltage is applied to the input terminal ⑧ of the control circuits X31, X32, and X33, and the operation of the circuit varies. More specifically, when inputs are applied to all of the input terminals ③, ④, ⑤ of the control circuits X31, X32, and X33 prior to the remote-control operation, an output is produced at the output terminal ⑥ and held for 5 seconds, but subsequent to the remote-control operation, outputs are produced at the output terminals ⑥ and ⑦ over the period during which an input signal is being applied to the input terminals ④ and ⑤.

Accordingly, during remote control, when the signal of the numeral of one of the digits among the numerals of the three digits arrives, outputs are produced at the output terminals ⑥ and ⑦ of the circuit corresponding to the numeral of the digit of the input signal in the control circuits X31, X32, and X33. In the control manipulation described below, only a signal from the output terminal ⑦ is used.

When the transistor Tr2 becomes conductive as described above, a circuit X40 for holding the rewinding state is held in a state wherein it is controlled by the charging current of a capacitor CA13, and an output signal is sent out from the output terminal ④. This signal from the output terminal ④ is applied by way of diodes D42 and D45 and a resistor R28 to the base of a transistor Tr6, which is thereby rendered conductive. Consequently, a short circuit is established between a line *f* and ground, and the bias current for the base of the transistor Tr1 is cut off, whereby the transistor Tr1 assumes the nonconductive state. Accordingly, the plunger solenoid SOL2 for driving the apparatus on the side for recording incoming messages assumes the inoperative state, and the force with which a pinch roller 71 presses against its capstan 72 is removed.

In addition, the above mentioned output signal from the output terminal ④ of the holding circuit X40 passes through the diode D42 and a resistor R32 and is applied to the base of a transistor Tr5, which thereupon assumes the conductive state. As a consequence, the output current from the power-supply circuit X15 passing through the line *n* as shown in FIG. 5A is supplied through the transistor Tr2 in conductive state and a relay contact point Sf5 to a plunger solenoid SOL3 for driving the rewinding mechanism, whereupon this plunger solenoid SOL3 operates. Accordingly, a roller 79 for rewinding, which is driven by the motor 60, presses against the reel disk on the supply side, and the apparatus 10 is changed over from the state for recording incoming messages to the rewinding state.

Furthermore, the above mentioned output signal from the terminal ④ of the circuit X40 passes also through the diode D42, another diode D35, and a resistor R26 to be applied to the base of a translator Tr3, which thereupon assumes the conductive state. Consequently, the relay 54 for changing over the apparatus from its state for recording incoming messages to the state for playing back incoming messages operates, and the relay contact points Se1 and Se2 are switched.

During the above mentioned rewinding, the head assembly 70 on the side of recording incoming message is contacting with light pressure a tape traveling at high speed, whereby a signal reproduced by the head H3 in the head assembly 70 is applied by way of the relay contact point Sel to the play-back amplifier X9, which is in its operative state because of the output of the switch circuit X8. The resulting output signal from the amplifier X9 is applied by way of the line 34, switch S2-5, and relay contact point Se2 to the transformer T2 and the line *u*. This signal is further transmitted through the transformer T2 to the telephone line side, and although the sender of signals for remote control from the remote place cannot understand any information which has any meaning, he can verify that the apparatus is undergoing rewinding operation. Furthermore, the reproduced sound at the time of this rewinding operation from the play-back amplifier X9 is sent as output into a line *l*.

During the rewinding operation due to the above described remote control, the output signal from the terminal ④ of the circuit X40 for holding the rewinding state is supplied by way of a diode D33 to an input terminal ⑨ of the control circuits X31 and X33. Consequently, these circuits X31 and X33 lose their functions, control of the first digit and the third digit duting the rewinding operation becomes impossible.

During this rewinding operation, furthermore, an automatic rewinding stopping circuit X44 receives at the input terminal ⑤ a signal from the output terminal ④ of the circuit X40 and is being held in an operable state. At this time, moreover, the reproduced sound of the rewinding operation is being applied through the line *l* to the terminal ③ of the stopping circuit X44.

When, during the above mentioned rewinding operation, the tape 73 in the cassette for recording incoming messages is rewound to it part where the stop signal is recorded, a stop signal is reproduced by the recording-reproducing head H3 of the head assembly on the incoming message side and is applied by way of the line *l* to the input terminal ③ of the stopping circuit X44. This stop signal is distinguished within the circuit X44 from the reproduced sound of the rewinding operation, amplified, rectified, DC amplified, and led out as a DC output signal through the output terminal ④. this output signal is applied through a diode D31 to the input terminal ⑤ of the circuit X40 for holding the rewinding state thereby to reset the circuit X40 into the inoperative state. Consequently, the plunger solenoid SOL3 for rewinding is rendered inoperative, and the rewinding operation of the tape 73 in the cassette on the side for recording incoming messages stops.

Furthermore, the holding circuit X40 is rendered inoperative, whereby the output signal from the output terminal ④ stops, and a signal is no longer applied to the base of the transistor Tr6. As a consequence, this transistor Tr6 is placed in the non-conductive state, and the transistor Tr1 is again assumes the conductive since the short circuit between the line *f* and ground is broken. The plunger solenoid SOL2 for driving is thereby activated, and the tape 73 in the cassette for the message recording side is clampled between and driven by the pinch roller 71 and the capstan 72.

At the same time, the above mentioned stop signal is applied to the input terminal ③ of a circuit X38 for holdig the play-back state, whereupon this holding circuit X38 was controlled into the operative state and thus held. When the holding circuit X38 is thus converted into the operative state, a voltage is produced at the output terminal ④ and applied through a diode D34 and a resistor R26 to the base of a transistor Tr3, which thereby assumes the conductive state. Accordingly, the relay 54 is supplied with the output current from the DC power supply circuit X15 through the same power supply circuit as that for the plunger solenoid SOL3 for rewinding and thereby operates, and the relay contact points Sel and Se2 are switched.

The voltage produced at the output terminal ④ of the holding circuit X38 is applied by way of diodes D34 and D51 and line *q* to the switching circuit X8. The switching circuit X8 is supplied with a DC current from the power-supply circuit X15 through the line 30, relay contact point Sc1, switch S4-1, relay contact point Sc2 and switch S2-7, and operates in response to the signal from the line *q* to switch the power supply for the amplifier from the recording side to the play-back or reproducing side. As a result, the apparatus is changed over from the rewinding state to the state for playing back recorded incoming messages.

At any position during the rewinding operation of the apparatus as described above, the apparatus can be changed over from the rewinding mode to the play-back mode by the following manipulation and operation. When, during the rewinding operation, the manipulator transmits a second-digit signal, input are applied to the input terminals ④ and ⑤ of the control circuit X32, and outputs are produced at output terminals ⑥ and ⑦. Of these, the output signal from the terminal ⑦ is applied by way of a diode D28 to the input terminal ⑤ of the holding circuit X40 for holding the rewinding state, which circuit thereby is rendered inoperative. When the holding circuit X40 is thus rendered inoperative, the plunger solenoid SOL3 becomes inoperative in the same manner as was discribed above, while the plunger solenoid SOL2 on the incoming messages side. Furthermore, the output signal from the output ⑦ of the circuit X32 is applied to a control circuit X37. From the instant this output signal is cut off, an output signal is generated for a specific time from the output terminal ④ and applied to the input terminal ③ of the circuit X38 for holding the play-back state, which circuit thereby becomes operaive. Thereafter, the apparatus is changed over from the rewinding state to the state for playing back recorded incoming messages by the same operation as was described above. At this time, moreover, the other control circuits X31 and X33 recover their functions since the voltage being applied up to that time from the rewinding state holding circuit X40 to all terminals ⑨ is cut off.

When, after the apparatus has been placed in the in the play-back state, and the tape within the cassette for recording incoming messages is being played back, the owner of the apparatus wishes to add some comments to the tape 73 in the cassette for recording incoming messages, he carries out the following procedure. When the manipulator transmits a first-digit signal for a short time during play-back of a recorded incoming message, the control circuit X31 of the apparatus receives this signal and operates to produce an output at its output terminal ⑦. This output signal is supplied to respective input terminals ③ of a control circuit X35 and of a delay circuit X36.

After its input signal has been cut off, the control circuit X35 produces an output for a specific time at its output terminal ④. This output passes through a diode D29 and is applied to input terminal ⑤ of the circuit X38 for holding the play-back state, which circuit becomes inoperative as ceases to produce an output signal at its output terminal ④. Consequently, the current applied to the base of the tranistor Tr3 is cut off, and the relay 54 becomes inoperative, the relay contact points Se1 and Se2 being switched to their original states. In addition, the outut signal for the line *q* also disappears, and the switch circuit X8 returns to its original state. Since the recording amplifier X12 becomes operative, a message from the caller is recorded on the tape 73 of the cassette for recording incoming messages by the recording-reproducing head H3 within the head assembly 70 on the side for incoming messages.

When the caller replaces the telephone handset on its cradle with the apparatus set in the above described recording state, the incoming signal from the telephone circuit to the recording amplifier X12 disappears. Consequently, the output signal from the amplifier X12 passing through the line 39 for the VAC X10 is cut off. Accordingly, an output signal from the VAC X10 for the control circuit X7 by way of the diode D15 is similarly cut off approximately 10 seconds after the incoming signal is cut off. Therefore, the control circuit X7 becomes inoperative, and the apparatus is changed over from the recording state to the standby or ready state.

The case wherein the apparatus continuously receives a first-digit signal will now be considered. This signal is supplied to the delay circuit X36, which becomes conductive a specific time (approximately 2 seconds) after being supplied with its input, and an output signal appears from its output terminal ④. This output passes through diodes D24 and D29 and enters the play-back state holding circuit X38, thereby resetting this holding circuit into its inoperative state. Consequently, the apparatus is changed over from the play-back state to the incoming message recording state as described above.

Furthermore, the output from the terminal ④ of the delay circuit X36 passes through a line *m* and is supplied by way of a diode D16 to a stop-signal generator X14. As a consequence, the signal generator X14 operates to generate a stop signal which is recorded on the tape 73 by the head H3 of the head assembly 70. thus, the caller, after hearing the recorded incoming signals, continuously transmits the first-digit signal, whereby a stop signal can be newly recorded, and erroneous erasing of important recorded incoming messages can be avoided.

When the apparatus receives a second-digit signal transmitted by the caller during the playing back of a recorded incoming message, the control circuit X32 operated, and an output is produced at the out terminal ⑦. At this time, the play-back state holding circuit 38 is already held in operative state, and a circuit X39 for holding the state of recording a notice of the owner's absence is being supplied at its input terminal ① with an output signal from the above mentioned holding circuit X38. The output from the output terminal ⑦ of the control circuit X32 is applied through a diode D27 to the input terminal ③ of the recording state holding circuit X39, which is thereby controlled, and an output appears at its output terminal ④. This output from the output terminal ④ is applied by way of a timer circuit X42 and a resistor R27 to the base of a transistor Tr4 and by way of a diode D44 and the resistor R28 to the base of the transistor Tr6. When the transistor Tr6 is thus supplied with current at its base, it becomes conductive, and the transistor Tr1 becomes non-conductive, its base being short circuited with respect to the line *f*. The plunger solenoid SOL2 on the incoming message side is thereby rendered inoperative, whereby the pinch roller 71 stops pressing against the capstan 72, and the driving of the tape 73 in the cassette on the incoming message recording side is stopped.

The timer circuit X42, upon being supplied with the above mentioned output from the output terminal ④, produces an output at its output terminal ③ for a predetermined time (approximately from 2 to 3 seconds). This output is applied by way of a diode D36 and a line *g* to the beep tone generating circuit X6 and is simultaneously applied to the input terminal ③ of a control circuit X43. Consequently, the beep tone generating circuit X6 operates, and a beep tone is generated through the line 38 and is transmitted by way of the transformer T2 to the telephone line side.

After its input signal has been cut off, the control circuit X43 produces an output at its output terminal ④ for a predetermined time. This output passes through a diode D38 and is supplied to the relay 55 for recording anew the notice of the owner's absence, which is being grounded by the conductive state of the transistor Tr4. Consequently, relay contact points Sf1 through Sf5 are switched, and the relay 55 is self-held by the closing particularly of the relay contact point Sf4. Furthermore, the output from the output terminal ④ of the control circuit X43 is applied through a diode D37, a resistor R23, and a line *b* to the relay holding circuit X4, and the relay 50 operates. Consequently, the relay contact points Sa1 and Sa2 are switched, and the plunger solenoid SOL1 on the answering side and the motor 60 become operative, and the apparatus on the answering side is activated.

As another result of the operation of the relay 55, the relay contact point Sf5 is switched, whereupon the relay 54 no longer receives power and assumes its inoperative state. At this time, furthermore, as a result of the switching of the relay contact points Sf1 through Sf3, a recording-reproducing head H1 and an erasing head H2 incorporated in a head assembly 78 on the answering side become operative. After hearing the beep tone indicating the start of recording of a new message, the caller can record a new message on an endless tape 74 on the answering side.

As a result of the above described operation, the endless tape 74 completes on cycle of travel, and the sensing tape 22 short circuits a sensor 77, whereby the sensor operation circuit X5 operates, and an output produced in the line 37 is applied by way of a diode to the beep tone generating circuit X6. Consequently, the beep-tone output signal from the circuit X6 is supplied through the line 38 to the transformer T2 and is transmitted further through the telephone line to the caller. The sensor operation circuit X5 produces an output into the line 35 simultaneously with the cutting off of the output signal for the line 37. The output produced in the line 35 is applied to the circuit X4 for relay control holding, which is rendered inoperative, whereby the relay 50 becomes inoperative. Consequently, the plunger solenoid SOL1 on the answering side becomes inoperative, and the apparatus on the answering side is stopped.

In addiiton, the output produced in the line 35 is applied through a line *d* to a control circuit X41. This control circuit X41 is of the same type as the control circuit X34 and, after the input applied to the input terminal ③ stops while power is being supplied through the relay contact point Sf5 to the input terminal ①, produces an output at the output terminal ④. This output is applied by way of a diode D30 to the input terminal ⑤ of the circuit X39 for holding the state of recording of a notice of absence of the owner, which circuit X39 is rendered inoperative. Furthermore, the output signal from the control circuit X41 is applied through a diode D32, a resistor R33, and the line *b* to the relay control holding circuit X4, which thereupon operates. Accordingly, the relay 50 again operates, and the answering side apparatus operates.

When the above mentioned holding circuit X39 becomes inoperative, the transistor Tr4 is turned off, and the relay 55 for recording anew the notification of the owner's absence is also turned off. When the relay 55 is thus turned off, a DC current from the DC power supply X15 is supplied by way of the relay contact point Sf5, whereby the relay 54 again assumes the operative state. As a result, the recording-reproducing head H1 in the head assembly 78 and the amplifier are changed over to the play-back side, and playing back of the recorded new message is carried out.

When, upon completion of an automatic check of the recorded content as described above, the sensor 77 is again short circuited by the sensing tape 22 of the endless tape 74, the sensor operation circuit X5 operates. Thereupon, similarly as described above, the beep tone generating circuit X6 first operates to transmit a beep tone to the caller's side. Furthermore, the relay control holding circuit X4 is rendered inoperative, and relay 50 is turned off, whereupon the plunger solenoid SOL1 of the answering side becomes inoperative. Accordingly, the endless tape 74 on the answering side is released from its pressed and driven state between the capstan 76 and pinch roller 75 and stops.

As another result of the relay 50 being turned off, an output from a line *h* disappear, whereby the transistor Tr6 becomes nonconductive and the transistor Tr1 again becomes conductive. The plunger solenoid SOL2 of the incoming message side is activated, and the pinch roller 71 is pressed against the capstan 72, and the apparatus on the incoming message recording side operates.

Since its power supply is being cut off by the relay contact point Sf5, the control circuit X41 is held in its inoperative state even when output signal passing from the sensor operation circuit X5 through the line *d* is applied to the input terminal ③ of the circuit X41. Consequently, the holding circuit X4 is also held in inoperative state. Therefore, at time when the automatic check of the recorded new message is completed, the play-back state holding circuit X38 is in operative state as described hereinbefore. If the apparatus receives a second-digit signal, it will repeat its operation of recording a new message.

In the case where, during recording of an incoming message by the above described control manipulation, the caller transmits a second-digit signal, the apparatus operates in the following manner. When the apparatus receives the second-digit signal, outputs are produced at the selectors X27 and X28 and are supplied to the input terminals ④ and ⑤ of the control circuit X32 and, at the same time, as transmitted by way of diodes D19 and D20 to lines *t* and *s*. The control circuit X32 is activated by arrival of the above mentioned signal and produces and output through its output terminal ⑦ thereby to activate the control circuit X37 and the play-back state holding circuit X38 similarly as described above. The apparatus thereby assumes its state of playing back recorded incoming messages.

An output signal passing through a line *n* from the power supply circuit X15 is transmitted through the transistor Tr2, a line 45, and a diode D23 to enter a line r. The switch circuit X11 is supplied simultaneously with signals through the input lines *r*, *s*, and *t* and operates to cut off the power supply for the recording amplifier X12. The reason for this is that, when a control signal is received during recording operation and is recorded, as it is, on the tape, this signal will be reproduced in the playing back of a recorded incoming message to cause erroneous operation, and this must be prevented. That is, the reception of any control signal from among the control signals of three digits during recording immediately causes the recording amplifier to be turned on.

In the case where the caller transmits a thirddigit signal during recording of an incoming message, the apparatus operates as follows. When the apparatus receives this signal through the telephone line the power supply of the recording amplifier X12 is cut off by the switching circuit X11 and is in the inoperative state while this signal is being received. On one hand, the control circuit X33 operates, and the output from the output terminal ⑦ is applied by way of a diode D25 to the input terminal ③ of the circuit X38 for holding the play-back state. Consequently, the holding circuit X38 operates, and an output from its output terminal ④ causes the transistor Tr3 to be held in its conductive state. Accordingly, the relay 54 is activated, and the amplifiers and signal system of the apparatus are placed in the play-back or reproducing state.

In addition, the output of the control circuit X33 is applied through a diode D26, the diode D45, and a resistor R28 to the base of the transistor Tr6, which thereby becomes conductive. As a consequence, the base of the transistor Tr1 and ground are short circuited, whereby this transistor becomes nonconductive, and the plunger solenoid P2 on the incoming message side becomes inoperative. The pinch roller 71 is thereby no longer pressed against the capstan 72. At the same time, the output of the control circuit X33 is applied by way of the diode 26 and the resistor R32 to the base of the transistor Tr5, which thereupon becomes conductive. Consequently, the plunger solenoid SOL3 for rewinding operate only while the third-digit signal is being received, whereby the roller 79 for rewinding driven by the motor 60 presses against the reel disk on the supply side, and rewinding of the cassette tape 73 on the incoming message side takes place.

When reception of the third-digit signal stops, the output from the control circuit X33 disappears, the current applied to the bases of the transistors Tr5 and Tr6 is cut off, whereby these transistors become nonconductive, but the transistor Tr3 is held in its conductive state since the holding circuit X38 is in operative state. When the transistor Tr6 becomes nonconductive, the plunger solenoid SOL3 for rewinding becomes inoperative, and the rewinding roller 79 stops pressing against the reel disk on the supplying side, whereupon the rewinding operation stops. Furthermore, as a result of the changing over of the transistor Tr5 to its nonconductive state, the transistor Tr1 becomes conductive, and the plunger solenoid SOL2 on the incoming message side becomes operative, whereby the corresponding cassette tape 73 is clamped between the pinch roller 71 and the capstan 72 and is again driven thereby. At this time, the transistor Tr3 is held in the conductive state, and the relay 54 maintained in operative state, whereby the apparatus is placed in the state for reproducing recorded incoming messages.

In all operations of the apparatus other than the recording of incoming messages, there is some DC output in a line 46 and is being supplied through a diode D39, a resistor R24, and a line *k* to the VAC X10. Consequently, the output of the VAC X10 at this time is being supplied by way of the diode D15 to the control holding circuit X7, which is thereby being held in its operative state.

In the case where, when the apparatus is operating in response to a call from an ordinary caller and is carrying out recording of the caller's message, the tape for this recording reaches its extreme end position, the following operation is carried out. When the tape thus reaches its extreme end position, an end switch S6 (switch 80 in FIG. 10) is closed by tape tension, and a DC voltage supplied from the power-supply circuit X15 is supplied through the line *a* to a tape end control circuit K45. This control circuit X45 is supplied with a DC current at its input terminal ④ and is in operative state and, when an input is applied to its input terminal ③, immediately produces a DC signal through its output terminal ⑦. This signal passes through a ling *p* and is applied to the switching circuit X8, and the power supply for the reproducing amplifier X9 is cut off. The terminal ③ of the control circuit X45 is connected directly to the switch S6, and while this switch S6 is closed, an output is produced at the output terminal ⑤. This output is applied through the line *g* to the beep-tone generating circuit X6, which thereby operates to generate a beep tone. This beep tone is transmitted by way of the line 38 and the transformer T2 to the caller.

After the elapse of a predetermined time (approximately 1 second) from this transmission of the beep tone, a DC signal is emitted from the output terminal ⑥ of the control circuit X45 and is applied by way of a line *e* to a silicon-control rectifier SCR1. Consequently, the rectifier SCR1 is turned on, and the base and emitter of the transistor Tr1 are short circuited, whereby this transistor becomes nonconductive. Accordingly, the plunger solenoid SOL2 for driving the apparatus on the incoming message recording side is rendered inoperative, and the pinch roller 71 is no longer pressed against the capstan 72. The tension in the magnetic tape 73 thus released from the clamping and driving action of the pinch roller 71 and the capstan 72 weakens, and the switch S6 is again opened. The output from the terminal ⑦ of the above mentioned control circuit X45 is sustained until there is a succeeding call signal and an input is applied to the input terminal ④.

Accordingly, at the time of the succeeding call signal, since the play-back amplifier X9 is already being held in the inoperative state, the endless tape 74 on the answering side is driven, similarly as described hereinbefore, and the recorded statement is reproduced by the recording reproducing head H1 of the head assembly 78 for the answering side, but sending of the answering statement to the caller is not carried out. Therefore, while the cassette tape on the side for recording incoming messages is being wound up to its extreme end, a general caller is not informed of the answering statement and merely hears a beep tone, and recording of an incoming message through error is prevented. The beep tone is generated by the beep-tone generating circuit X6 and is transmitted by way of the telephone line to the caller, after the time period required for the endless tape 74 on the answering side to travel on cycle elapses. In the above described situation, the owner of the apparatus can verify the fact that the tape for recording incoming messages has been wound to its extreme end and, moreover, can freely carry out rewinding control manipulations, whereby there is no problem.

Figure 6:
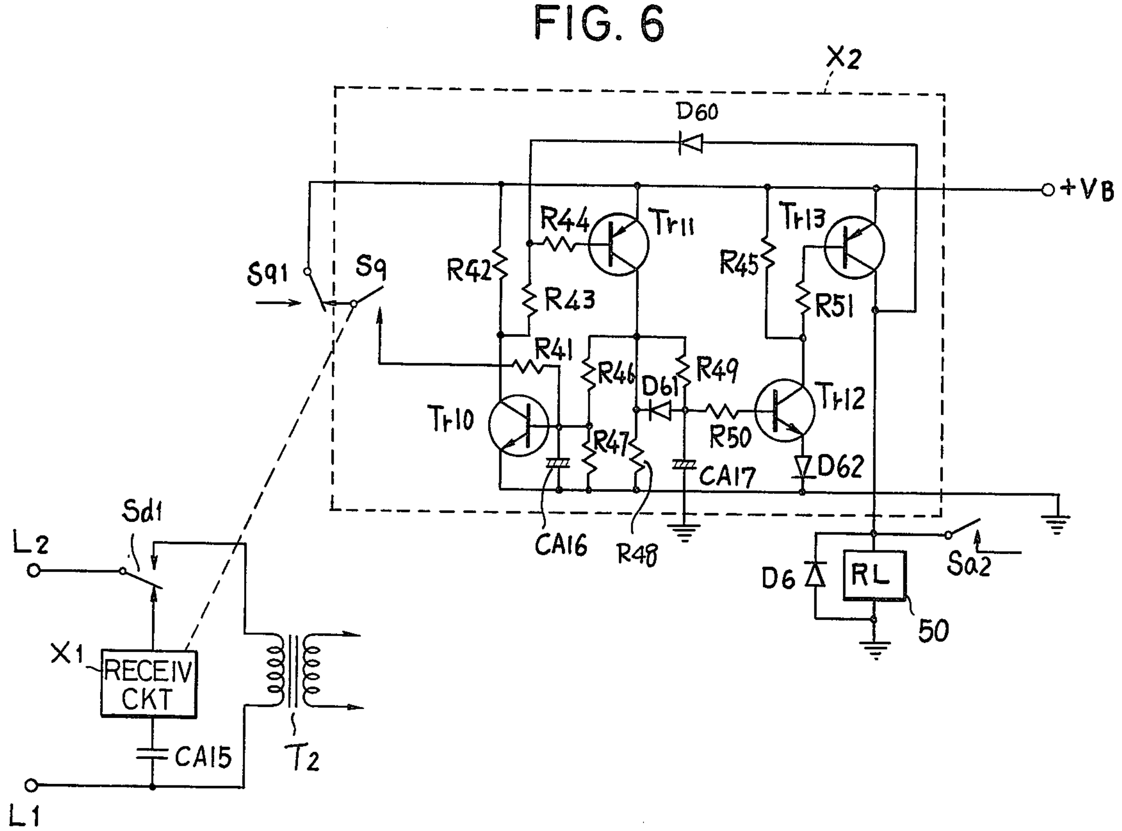
FIG. 6 is a circuit diagram of one embodiment of a specific electrical circuit of the circuit for receiving incoming call signals shown in FIG. 4.

An embodiment of the circuit X2 for receiving call signals of the apparatus of the present invention will now be described with reference to FIG. 6, in which parts which are the same as those in FIG. 4 are designated by like reference numerals or characters. Detailed description of such parts already described will not be repeated. The signal receiving circuit X1 operates upon detecting a call signal sent by a caller, and a normally-opened contact point S9 closes in an intercoupled manner. The stationary contact point of the contact point S9 is connected by way of a resistor R41 to the base of an NPN transistor Tr10. The collector of this transistor Tr10 is connected by way of a resistor R42 to a power supply +VB and by way of resistors R43 and R44 to the base of a PNP transistor Tr11. The emitter of the transistor Tr10 is grounded. A parallel circuit of a capacitor CA16 and a resistor R47 is connected between the base of the transistor Tr10 and the ground line.

The emitter of the transistor Tr11 is connected to the power supply +VB, while the collector thereof is connected by way of a resistor R48 to the ground line and by way of a resistor R46 to the base of the transistor Tr10. In addition, the collector of the transistor Tr11 is connected through the cathode of a diode D61 and through a resistor R49 to the anode of the diode D61. Furthermore, the anode of the diode D61 is connected through a capacitor CA17 to the ground line and through a resistor R50 to the base of an NPN transistor Tr12. The emitter of the transistor Tr12 is connected through a regular-direction diode D62 to the ground line, while the collector of this transistor is connected through a resistor R45 to a power supply line and through a resistor R51 to the base of a PNP transistor Tr13. The emitter of the transistor Tr13 is connected to the power supply line, while the collector thereof is connected through a regular-direction diode D60 to the junction between the resistors R43 and R44 and also to one end of the control relay 50 on the answering side.

When a call signal arrives at terminals L1 and L2 of the telephone line, this signal enters through the input terminal L2 and is applied by way of the relay contact point Sd1 to the call signal receiving circuit X1, which thereupon operates, whereby the relay contact point S9 is closed. When the contact point S9 is thus closed, the power-supply voltage +VB is applied by way of the relay contact point Sa1 and S9 and resistor R41, to the base of the transistor Tr10, which thereupon becomes conductive. Consequently, the base of the transistor Tr11 is biased through the transistor Tr10 and the resistors R43 and R44, whereby the transistor Tr11 similarly becomes conductive. Accordingly, the level of the collector voltage of the transistor Tr11 becomes substantially equal to that of the power-supply voltage +VB, and the base of the transistor Tr10 is biased through the resistor R46, and this transistor is held in its conductive state. Accordingly, the two transistors Tr10 and Tr11 are holding each other in the conductive state.

On one hand, when the transistor Tr11 becomes conductive, the capacitor Ca17 is supplied with current from the power supply through the emitter and collector of the transistor Tr11 and the resistor R49, and its charged voltage gradually rises in accordance with a time constant determined by the resistance value of the resistor R49 and the capacitance value of the capacitor CA17. When the charged voltage of the capacitor CA17 becomes a specific value determined by factors such as the regular-direction voltage of the diode D61 for level shifting, a bias current is applied through the resistor R50 to the base of the transistor Tr12, which is thereby rendered conductive. As a result, the base of the transistor Tr13 is biased through the transistor Tr12 and the resistor T51, whereby the transistor Tr13 becomes conductive.

When the transistor Tr13 thus becomes conductive, the control relay 50 on the answering side is supplied with a current from the power supply +VB through this transistor Tr13 and thereby is activated. The relay contact point Sa1 is thereby switched, and the relay contact point Sa2 for self-holding is closed, whereby the relay 50 is self-held in the operative state.

Accordingly, the relay 50 is rendered conductive by the arrival of a call signal, and the capacitor is charged by a current from the power source through transistor circuits held in conductive state. The relay 50 operates after the elapse of a predetermined time determined by a time constant including the capacitor, whereby the apparatus assumes the answering state after the elapse of a specific time from the instant of arrival of a call signal irrespective of the nature of the call signal.

When the transistor Tr13 becomes conductive, its collector voltage is applied by way of the diode D60 and the resistor R44 to the base of the transistor Tr11, whereby the bais voltage between the base and emitter of the transistor Tr11 is nullified and becomes extremely small, and this transistor Tr11 becomes nonconductive.

Consequently, the bais which has been applied to the base of the transistor Tr10 through the resistor R46 is cut off, whereby the transistor Tr10 similarly becomes inoperative. As a result, the self-holding circuit comprising the transistors Tr10 and Tr11 is reset.

In addition, when the transistor Tr11 becomes nonconductive, the charge in the capacitor CA17 is promptly discharged through the diode D61 and the resistor R48, and the transistor Tr12 becomes nonconductive, whereby the transistor Tr13 also becomes nonconductive. The relay 50, however, is held in the operative state by the closure of the relay contact point Sa2.

Since the various functional operations of the remote control described hereinbefore are accomplished by the combinations of the above described circuit operations, description of individual actions will be omitted. operative The remote-control system and apparatus of an automatic telephone answering and recording apparatus according to the present invention have a number of advantageous features as enumerated below.

1. By using, as control signals, pair tone signals respectively corresponding to the numerals 0 through 9 of respetive push-buttons of a touch-tone telephone, the touch-tone telephone can be used directly as it is as a control signal generator by a remote-control manipulator without the necessity of any special equipment, whatsoever, on his side, and a remote-control system can be readily and practically realized as touch-tone telephones become widely used.

2. By suitaby combining the numerals 0 through 9, control signals of a desired number of digital positions can be established, whereby set signals of a wide variety can be formed thereby to afford ample protection of secrets.

3. By suitably combining the numerals 0 through 9 to establish control signals of a plurality of digital positions, and sending only signals of selected digital positions in correspondence with respective digits, it is possible to control the operational modes of various kinds of the apparatus in correspondence to the signals thus sent.

4. The control operations of rewinding of the tape for recording incoming messages, sending a stop signal at any time to change over the apparatus from rewinding to play-back operation, and hearing any part of recorded contents can be carried out from a place remote from the apparatus.

5. When, during recording of an incoming message, recording is carried out to the end of the tape, the caller can be notified automatically of the completion of the tape. Furthermore, it is possible thereafter to inform only the caller who has sent a specific control signal that the tape is at its end position.

6. It is possible to record a rewinding stopping signal at any part of the tape so as to prevent rewinding beyond a certain point on the tape. By this provision, the tape rewinding is not carried out beyond that point, whereby erroneous erasure of the tape part which is not rewound can be prevented.

Further, this invention is not limited to these embodiments but various variations and modifications may be made without departing from the scope and spirit of the invention.

What we claim is:

1. A remote control system for an automatic telephone answering and recording appartus which includes first means for recording on and reproducing from a first cassette tape an answering statement, and second means for recording on and reproducing from a second cassette tape incoming messages by callers; said system comprising:

a. answering means responsive to an incoming call arriving through a telephone line from a caller for automatically operating said first means to reproduce the answering statement previously recorded on said first cassette tape and for sending the statement through the telephone line toward the caller;
b. incoming message recording means responsive to completion of the reproduction of the answering statement by said first means for operating said second means to record on the second cassette tape incoming messages sent by the caller through the telephone line;
c. generating means for generating a plurality of kinds of pair tones comprising low tones and high tones;
d. detecting means responsive to a set a pair tones selected from the kinds of pair tones which are generated in sequence by said generating means and sent through the telephone line for producing a first control voltage only when the set of pair tone coincide with a predetermined set of pair tones;
e. first control means responsive to the first control voltage for driving said second means to rewind the second cassette tape;
f. second control means responsive to stopping of the rewinding of the second cassette tape for driving said second means to reproduce the incoming messages;

said detecting means, after producing the first control voltage, produces a second control voltage in response to first digital component pair tones of the set of pair tones which first digital component pair tones are generated by said generating means and sent through the telephone line, a third control voltage in response to second digital component pair tones of the set of pair tones which second digital component pair tones are generated by said generating means and sent through the telephone line, and a fourth control voltage in response to third digital component pair tones of the set of pair tones which third digital component pair tones are generated by said generating means and sent through the telephone line; and which further comprises means responsive to the second control voltage for converting said second means to a recording mode, means reesponsive to the third control voltage for converting said second means to a play-back mode, and means responsive to the fourth control voltage for converting said second means to a rewinding mode.

2. A remote control system according to claim 1 further comprising means for recording a stop signal on the second cassette tape in response to the second control voltage which is continuously produced by said detecting means in response to the first digital component pair tones continuously sent through the telephone line for a time interval which is over a predetermined time interval, and means for detecting the stop signal during the rewinding operation of the second cassette tape and converting said second means from the rewinding mode to the play-back mode.

3. A remote control system according to claim 1 further comprising means for converting said second means into an inoperative state and converting said first means into a recording mode in response to the third control voltage only when the second means is in the play-back mode.

4. A remote control system according to claim 1 further comprising detection means for detecting the complete take-up of the second cassette tape to the extreme end thereof, and means operated by said detection means to hold the apparatus in a ready state, merely generating a specific signal for notifying callers of the owner's absence without operating said answering means, and control means activated by the operation of said detection means when a signal sent from a caller at a time when the second cassette tape has been taken up to its extreme end is received for merely transmitting a specific signal to the caller, without sending the answering statement to inform a remotely controlling caller that the second cassette tape is at its extreme end position.

5. A remote control system according to claim 1 wherein said answering means comprises:
a. signal detecting means for detecting a call signal arriving through the telephone line;
b. a first transistor circuit assuming an ON state in response to the detection of said signal detecting means and thereafter sustaining said ON state;
c. a capacitor supplied with a voltage through said first transistor circuit in said ON state to be charged thereby;
d. a second transistor circuit assuming an ON state when the charged voltage of said capacitor reaches a predetermined value;
e. a relay operated by a current supplied through said second transistor circuit in said ON state to place the apparatus in answering state; and
f. a circuit adapted to cause said first transistor circuit to be placed in the OFF state by the ON state of said second transistor circuit and thereby to discharge the charge of said capacitor;

whereby the apparatus is adapted to assume the answering state after the elapse of a specific time determined by a time constant including said capacitor from the instant a call signal once arrive, irrespective of the kind of call signal, and said first transistor circuit is placed in its ON state.

* * * * *

UNITED STATES PATENT AND TRADEMARK OFFICE

CERTIFICATE OF CORRECTION

PATENT NO. : 3,904,826

DATED : September 9, 1975

INVENTOR(S) : Masamichi Murata and Yuji Urayama

It is certified that error appears in the above-identified patent and that said Letters Patent are hereby corrected as shown below:

Col. 8, line 67, "X15" should read --X5--. Col. 10, line 22, "swtich" should read --switch--; line 41, "swtich" should read --switch--. Col. 11, line 2, before "held" insert --self--. Col. 15, line 14, "message" should read --messages-- Col. 17, line 21, "outut" should read --output--; line 67, "operated" should read --operates--. Col. 18, line 64, "on" should read --one--. Col. 21, line 39, "FIG. 10" should read --FIG. 1C--; line 42, "K45" should read --X45--. Col. 23, line 37, "T51" should read --R51--. Col. 24, line 12, "operative" should be omitted. Col. 25, line 16, second "a" should read --of--.

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*